United States Patent
Mariyani et al.

(10) Patent No.: US 12,212,607 B1
(45) Date of Patent: Jan. 28, 2025

(54) INTERNET PROTOCOL MULTIMEDIA SUBSYSTEM (IMS) SLICING

(71) Applicant: T-MOBILE INNOVATIONS LLC, Overland Park, KS (US)

(72) Inventors: Anil Kumar Mariyani, Ashburn, VA (US); Subramania Kaushik, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/463,977

(22) Filed: Sep. 8, 2023

(51) Int. Cl.
*H04L 65/1016* (2022.01)
*H04L 65/1073* (2022.01)

(52) U.S. Cl.
CPC ...... *H04L 65/1016* (2013.01); *H04L 65/1073* (2013.01)

(58) Field of Classification Search
None
See application file for complete search history.

(56) References Cited

U.S. PATENT DOCUMENTS

| | | |
|---|---|---|
| 11,115,867 B2 | 9/2021 | Dowlatkhah et al. |
| 11,323,318 B2 | 5/2022 | Foti |
| 2020/0195495 A1 | 6/2020 | Parker et al. |
| 2020/0358909 A1* | 11/2020 | Ahmadi ............. H04L 65/1016 |
| 2021/0021647 A1* | 1/2021 | Cai .................... H04L 65/1026 |
| 2021/0036919 A1* | 2/2021 | Foti .................... H04L 41/0806 |
| 2021/0152615 A1* | 5/2021 | Karampatsis ....... H04L 65/1016 |
| 2021/0176817 A1* | 6/2021 | Takakura ............ H04L 65/1069 |
| 2023/0062145 A1* | 3/2023 | Sabeur ................. H04W 8/20 |
| 2023/0254348 A1* | 8/2023 | Kuravangi-Thammaiah ............... H04L 65/1069 709/224 |
| 2023/0422157 A1* | 12/2023 | Qiu ................... H04W 28/0268 |
| 2024/0107287 A1* | 3/2024 | Dauneria ................ H04W 8/06 |
| 2024/0137395 A1* | 4/2024 | Sabeur ................ H04L 65/1073 |

FOREIGN PATENT DOCUMENTS

| | | | |
|---|---|---|---|
| WO | 2019184987 A1 | 10/2019 | |
| WO | WO-2019184717 A1 * | 10/2019 | ......... H04L 65/1073 |

* cited by examiner

*Primary Examiner* — Phyllis A Book

(57) ABSTRACT

An Internet Protocol Multimedia Subsystem (IMS) uses IMS slices in association with wireless network slices. The IMS receives an IMS registration from an IMS user device. In response, a wireless communication network identifies the wireless network slice that currently serves the IMS user device. The wireless communication network and/or the IMS selects an IMS slice for the IMS user device based on the wireless network slice that currently serves the IMS user device. The IMS serves an IMS service to the IMS user device from the selected IMS slice over the identified wireless network slice.

20 Claims, 13 Drawing Sheets

INTERNET PROTOCOL MULTIMEDIA SUBSYSTEM (IMS) SLICING

TECHNICAL BACKGROUND

Wireless communication networks provide wireless data services to wireless communication devices like phones, computers, and other user devices. The wireless data services may include internet-access, data messaging, video conferencing, or some other data communication functionality. The wireless communication networks include wireless access nodes like Wireless Fidelity (WIFI) hotspots and Fifth Generation New Radio (5GNR) cell towers. The wireless communication networks have network elements like Access and Mobility Management Functions (AMFs) and User Plane Functions (UPFs) that deliver the wireless data services to the wireless communication devices over the wireless access nodes. In addition, the wireless communication networks comprise network elements like Home Subscriber Servers (HSSs) and Unified Data Repositories (UDRs) that provide data access and storage. The wireless communication networks further comprise wireless network slices. The wireless network slices comprise network elements that are customized to provides specific services like machine communications or video calling. For example, a video calling slice may have a UPF that is customized for video streaming.

An Internet Protocol Multimedia Subsystem (IMS) provides data communication services over the wireless communication networks to user communication devices like phones and computers. The data communication services include voice calling, video calling, data messaging, or some other multimedia communication product. The IMS often delivers the IMS services to the user communication devices over the wireless network slices in the wireless communication networks. The IMS comprises network elements like Call State Control Functions (CSCFs) and Application Servers (AS) that control the IMS services that are delivered to the user communication devices. The IMS also uses network elements in the wireless communication networks like HSSs and UDRs. For example, an IMS CSCF interacts with a wireless network HSS to select an IMS AS for a user communication device. The HSS typically retrieves subscriber data from the UDR to make this selection. The IMS further comprises IMS slices that have network elements that are customized to provide specific services like voice calling or short messaging. For example, an IMS AS in a voice calling slice may be customized to provide a high-quality voice calling service.

Unfortunately, the IMS and the wireless communication networks do not use their slices together in an effective and efficient manner. Moreover, the IMS users do not receive an IMS service over a wireless network slice that has been customized for the IMS service. The amount of wireless network slices and IMS slices is rapidly growing and makes this problem more acute.

TECHNICAL OVERVIEW

In some examples, an Internet Protocol Multimedia Subsystem (IMS) uses IMS slices in association with wireless network slices. The IMS receives an IMS registration from an IMS user, and in response, the IMS or a wireless communication network identifies the wireless network slice that currently serves the IMS user. The wireless communication network or the IMS selects an IMS slice for the IMS user based on the wireless network slice that currently serves the IMS user. The IMS serves an IMS service to the IMS user from the selected IMS slice over the identified wireless network slice.

In some examples, an Interrogating Call State Control Function (I-CSCF) receives an IMS registration having a user Identifier (ID) for a user communication device, and in response, transfers the user ID to a Home Subscriber Server (HSS). The HSS transfers the user ID to a Uniform Data Repository (UDR). The UDR identifies a network slice ID for the wireless network slice that currently serves the user communication device. The UDR identifies an IMS slice ID that is associated with the network slice ID. The UDR indicates the user ID and an IMS slice ID to the HSS. The HSS indicates the user ID and the IMS slice ID to the I-CSCF. The I-CSCF selects an IMS slice for the user communication device based on the IMS slice ID. The selected IMS slice serves an IMS service to the user communication device over the identified wireless network slice that currently serves the user communication device.

In some examples, an I-CSCF receives an IMS registration having a user ID for a user communication device, and in response, transfers the user ID to an HSS. The HSS transfers the user ID to a UDR. The UDR identifies a network slice ID for the wireless network slice that currently serves the user communication device and indicates the user ID and the network slice ID to the HSS. The HSS indicates the user ID and the network slice ID to the I-CSCF. The I-CSCF selects an IMS slice for the user communication device based on the network slice ID. The selected IMS slice serves an IMS service to the user communication device over the identified wireless network slice that currently serves the user communication device.

DETAILED DESCRIPTION

Figure 1:
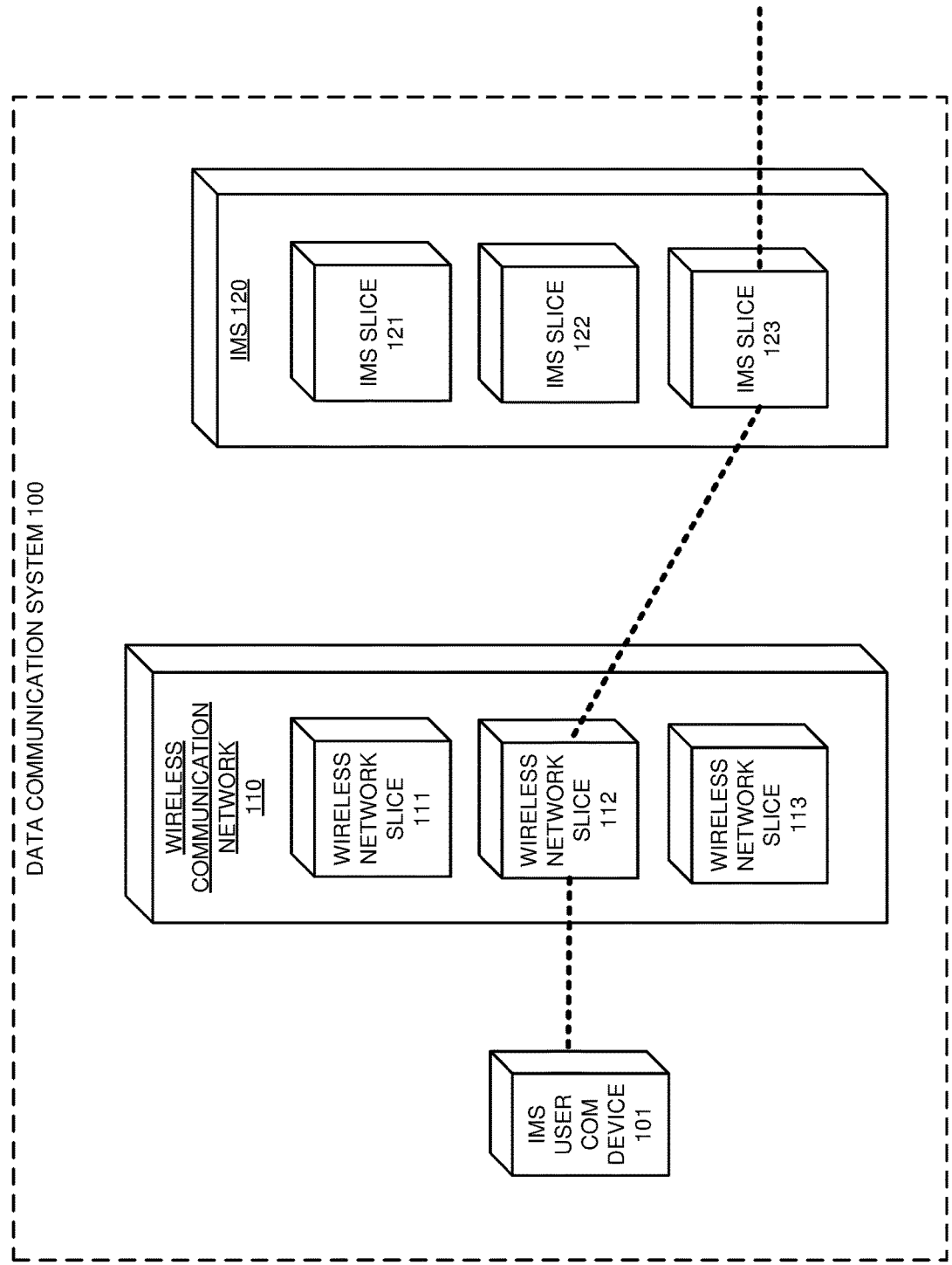
FIG. 1 illustrates an exemplary data communication system to deliver Internet Protocol Multimedia Subsystem (IMS) services to a user communication device using IMS slices in association with wireless network slices.

FIG. 1 illustrates exemplary data communication system 100 to deliver Internet Protocol Multimedia Subsystem (IMS) services to IMS user communication (COM) device 101 using IMS slices 121-123 in association with wireless network slices 111-113. Data communication system 100 delivers IMS services like voice calling, video calling, data messaging, or some other multimedia communications product. Data communication system 100 comprises IMS user communication device 101, wireless communication network 110, and IMS 120. IMS user communication device 101 comprises a phone, computer, vehicle, sensor, or some other data communication apparatus. Wireless communication network 110 comprises wireless network slices 111-113. IMS 120 comprises IMS slices 121-123. The amount of communication devices, network slices, and IMS slices is typically larger and has been restricted for clarity on FIG. 1.

In some examples, individual IMS slices 121-123 are associated with individual wireless network slices 111-113, and IMS 120 uses IMS slices based on these individual associations as follows. IMS 120 receives an IMS registration from IMS user communication device 101. In response to the IMS registration, wireless communication network 110 or IMS 120 selects one of IMS slices 121-123 for IMS user communication device based on the one of wireless network slices 111-113 that currently serves IMS user communication device. IMS 120 serves an IMS service to IMS user communication device 101 from the selected one of IMS slices 121-123 over the identified one of wireless network slices 111-113.

In some examples, wireless communication network 110 stores a network slice Identifier (ID) for wireless network slice 112 in association with an IMS slice ID for IMS slice 123. In response to wireless network slice 112 serving IMS user communication device 101, wireless communication network 110 stores a user ID for IMS user communication device 101 in association with network slice ID. Wireless communication network 110 selects IMS slice 123 for IMS user communication device 101 based on the association of the user ID for device 101 with the network slice ID for slice 112 and based on the association of the network slice ID for slice 112 with the IMS slice ID for slice 123. Wireless communication network 110 transfers the user ID and the IMS slice ID to IMS 120. IMS 120 selects IMS slice 123 for IMS user communication device 101 based on the IMS slice ID.

In some examples, IMS 120 stores the network slice ID for wireless network slice 112 in association with the IMS slice ID for IMS slice 123. Wireless communication network 110 stores a user ID for IMS user communication device 101 in association with network slice ID responsive to wireless network slice 112 serving IMS user communication device 101. Wireless communication network 110 transfers the association of this user ID with this network slice ID to IMS 120. IMS 120 selects IMS slice 123 for IMS user communication device 101 based on the association of the user ID for device 101 with the network slice ID for slice 112 and based on the association of the network slice ID for slice 112 with the IMS slice ID for slice 123.

In some examples, IMS 120 selects one of IMS slices 121-123 for IMS user communication device 101 by selecting a Serving Call State Control Function (S-CSCF). In some examples, IMS 120 selects one of IMS slices 121-123 for IMS user communication device 101 by selecting an Application Server (AS). IMS 120 may select an S-CSCF and/or AS in the IMS slice based on the geographic location of IMS user communication device 101, so the selected S-CSCF and/or AS is near IMS user communication device 101.

In some examples, IMS 120 transfers a user message to IMS user communication device over wireless communication network 110 that indicates the selected one of IMS slices 121-123. Subsequently, IMS 120 receives another IMS message from IMS user communication device 101 that indicates the selected one of IMS slices 121-123. IMS 120 transfers the IMS message to the proper one of IMS slices 121-123 based on the IMS slice indication in the IMS message. Thus, IMS 120 routes IMS messages to their proper IMS slices based on the IMS slice IDs in the IMS messages. The IMS slice IDs may be transported in Session Initiation Protocol (SIP) slice ID headers.

In some examples, wireless communication network 110 or IMS 120 changes the individual association of wireless network slice 112 from IMS slice 123 to IMS slice 122. IMS 120 then transfers an IMS message to IMS user communication device 101 that causes IMS user communication device 101 to transfer another IMS registration to IMS 120 over wireless network slice 112. IMS 120 receives the other IMS registration from IMS user communication device 120, and in response, wireless communication network 110 or IMS 120 selects IMS slice 122 for IMS user communication device 101. IMS 120 then serves the IMS service to IMS user communication device 101 from IMS slice 122 over wireless network slice 112.

In some examples wireless network slices 111-113 and IMS slices 121-123 are individually associated based on corresponding wireless network and IMS services like a video streaming slice in wireless communication network 110 being associated with a video calling slice in IMS 120. Wireless network slices 111-113 and IMS slices 121-123 may be individually associated based on corresponding Quality-of-Service (QoS) like a high-QoS slice in wireless communication network 110 being associated with a high-QoS slice in IMS 120. Both service and QoS may be used to make the association like a high-QoS voice streaming slice in wireless communication network 110 being associated with a high-QoS voice calling slice in IMS 120.

Wireless communication network 110 comprises network elements like wireless access nodes, network functions, and network databases. The network databases may include a Home Subscriber Server (HSS), Unified Data Management (UDM), Uniform Data Repository (UDR), Unstructured Data Storage Function (UDSF), or some other data memory.

Wireless communication network 110 uses wireless protocols like Wireless Fidelity, (WIFI), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and satellite data communications. IMS 120 comprises network elements like Call State Control Functions (CSCFs), Application Servers (ASs), or some other IMS apparatus. IMS user communication device 101, wireless communication network (including slices 111-113), and IMS 120 (including slices 121-123) comprise microprocessors, software, memories, transceivers, bus circuitry, and/or some other data processing components. The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, utilities, protocols, applications, and functions. The microprocessors retrieve the software from the memories and execute the software to drive the operation of data communication system 100 as described herein.

Figure 2:
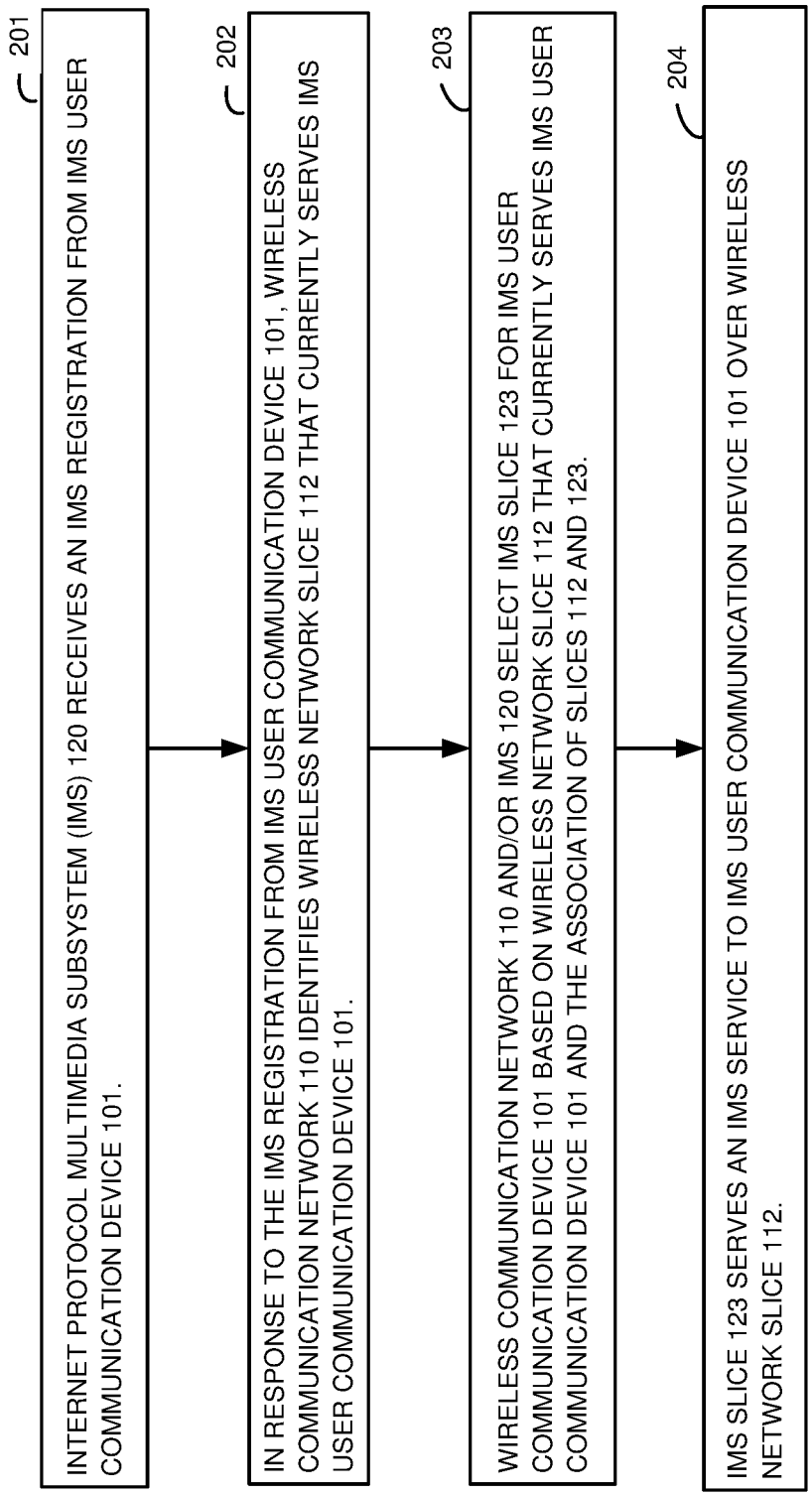
FIG. 2 illustrates an exemplary operation of the data communication system to deliver the IMS services to the user communication device using the IMS slices in association with the wireless network slices.

FIG. 2 illustrates an exemplary operation of data communication system 100 to deliver the IMS services to user communication device 101 using IMS slices 121-123 in association with wireless network slices 111-113. The operation may vary in other examples. IMS 120 receives an IMS registration from IMS user communication device 101 (201). In response to the IMS registration from IMS user communication device 101, wireless communication network 110 identifies wireless network slice 112 that currently serves IMS user communication device 101 (202). Wireless communication network 110 and/or IMS 120 select IMS slice 123 for IMS user communication device 101 based on wireless network slice 112 that currently serves IMS user communication device 101 and the association of slices 112 and 123 (203). IMS slice 112 serves an IMS service to IMS user communication device 101 over wireless network slice 123 (204).

Figure 3:
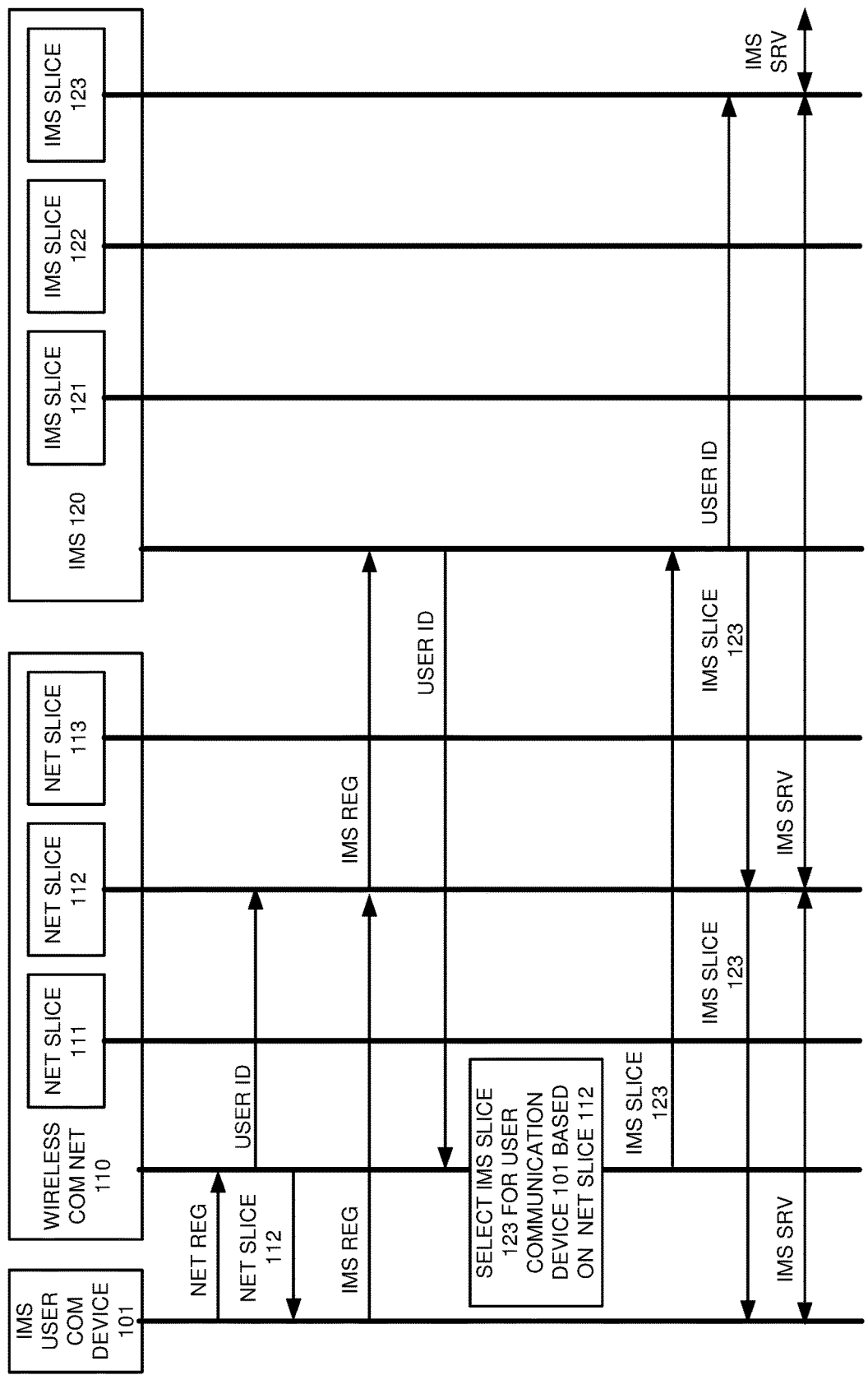
FIG. 3 illustrates an exemplary operation of the data communication system to deliver the IMS services to the user communication device using the IMS slices in association with the wireless network slices.

FIG. 3 illustrates an exemplary operation of data communication system 100 to deliver the IMS services to user communication device 101 using IMS slices 121-123 in association with the wireless network slices 111-113. Prior to the operation depicted in FIG. 3, wireless communication network 110 and IMS 120 associate IMS user communication device 101 with a user ID, and wireless communication network 110 associates wireless network slice 112 with IMS slice 123. IMS user communication device 101 transfers a network registration (NET REG) to wireless communication network 110 that indicates the user ID for device 101. Wireless communication network 110 selects wireless network slice 112 for IMS user communication device 101 in response to the network registration. Wireless communication network 110 directs wireless network slice 112 to serve IMS user communication device 101. Wireless communication network 110 directs IMS user communication device 101 to use wireless network slice 112.

IMS user communication device 101 then transfers an IMS registration indicating the user ID to IMS 120 over wireless network slice 112. In response to the IMS registration, IMS 120 queries wireless communication network 110 with the user ID. Wireless communication network 110 selects IMS slice 123 for IMS user communication device 101 based on the association of the user ID with wireless network slice 112, and the association of wireless network slice 112 with IMS slice 123. Wireless communication network 110 informs IMS 120 that IMS slice 123 should be used to serve the user ID. IMS 120 directs IMS slice 123 to serve IMS user communication device 101. IMS 120 directs IMS user communication device 101 to use IMS slice 123 over wireless network slice 112. IMS user communication device 101 receives the IMS service—like data messaging—from IMS slice 123 over wireless network slice 112.

Figure 4:
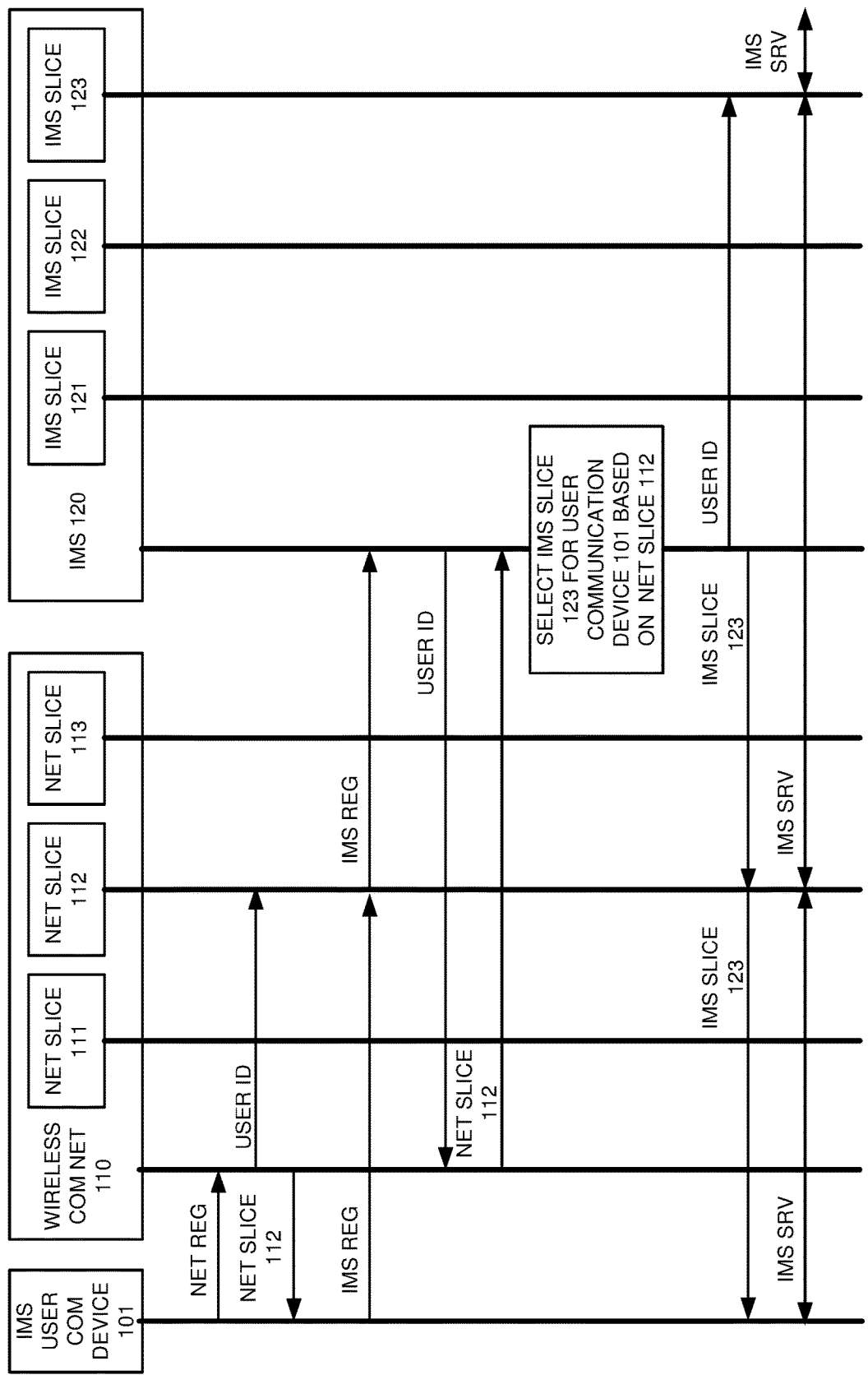
FIG. 4 illustrates an exemplary operation of the data communication system to deliver the IMS services to the user communication device using the IMS slices in association with the wireless network slices.

FIG. 4 illustrates an exemplary operation of data communication system 100 to deliver the IMS services to user communication device 101 using IMS slices 121-123 in association with the wireless network slices 111-113. Prior to the operation depicted in FIG. 4, wireless communication network 110 and IMS 120 associate IMS user communication device 101 with a user ID, and IMS 120 associates wireless network slice 112 with IMS slice 123. IMS user communication device 101 transfers a network registration to wireless communication network 110 that indicates the user ID for device 101. Wireless communication network 110 selects wireless network slice 112 for IMS user communication device 101 in response to the network registration. Wireless communication network 110 directs wireless network slice 112 to serve IMS user communication device 101. Wireless communication network 110 directs IMS user communication device 101 to use wireless network slice 112.

IMS user communication device 101 then transfers an IMS registration indicating the user ID to IMS 120 over wireless network slice 112. In response to the IMS registration, IMS 120 queries wireless network 120 with the user ID. Wireless communication network 110 indicates to IMS 120 that wireless network slice 112 serves the IMS user communication device 101. IMS 120 selects IMS slice 123 for IMS user communication device 101 based on the association of the user ID for device 101 with wireless network slice 112, and the association of wireless network slice 112 with IMS slice 123. IMS 120 directs IMS slice 123 to serve IMS user communication device 101. IMS 120 directs IMS user communication device 101 to use IMS slice 123 over wireless network slice 112. IMS user communication device 101 receives the IMS service—like data messaging—from IMS slice 123 over wireless network slice 112.

Advantageously, data communication system 100 uses network slice 112 and IMS slice 123 together in an effective and efficient manner. Moreover, IMS user communication device 101 receives IMS services over wireless network slice 112 that has been customized for the IMS service.

Figure 5:
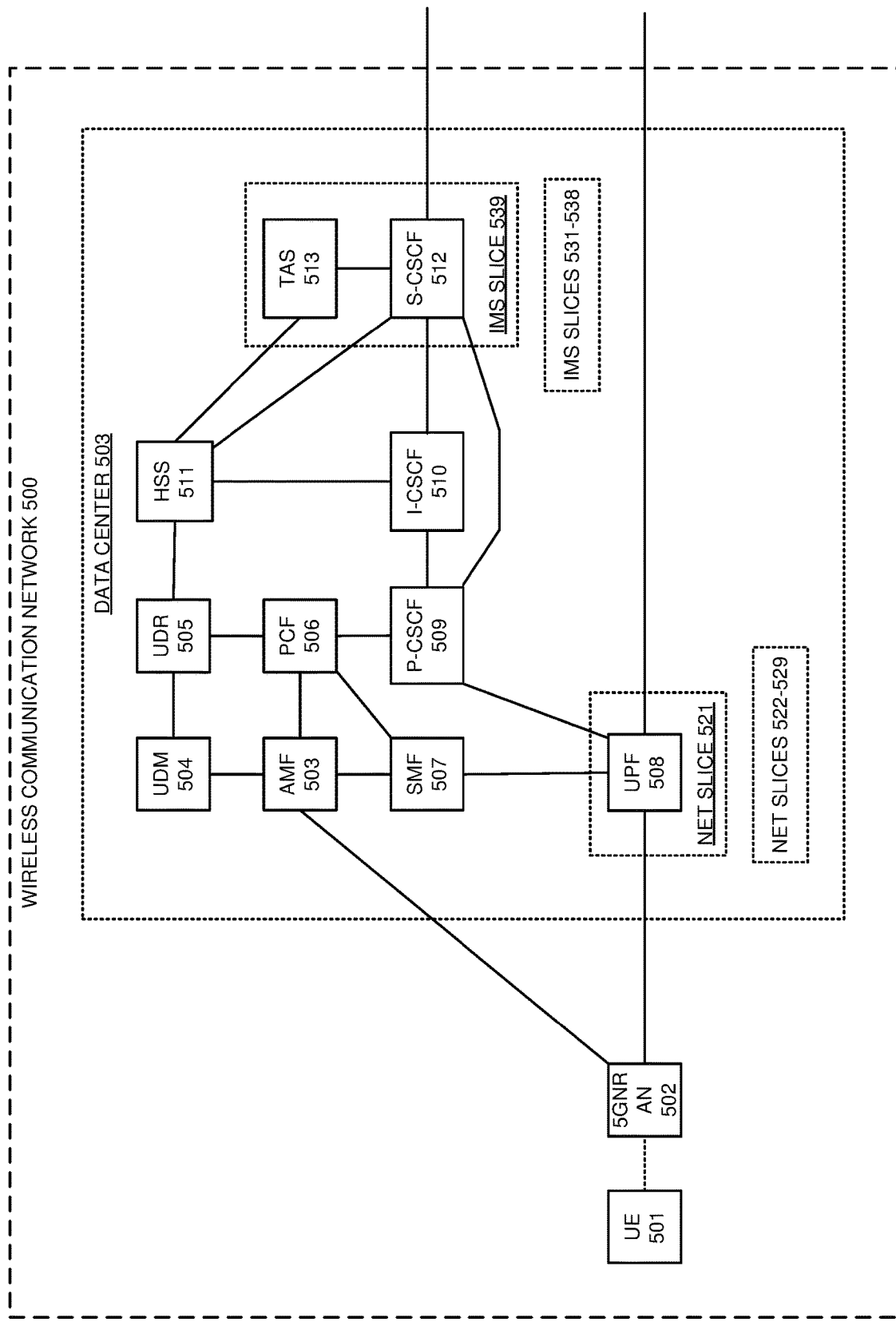
FIG. 5 illustrates an exemplary wireless communication network to deliver IMS services to a User Equipment (UE) using IMS slices in association with wireless network slices.

FIG. 5 illustrates exemplary wireless communication network 500 to deliver IMS services to User Equipment (UE) 501 using IMS slices 531-539 in association with wireless network slices 521-529. Wireless communication network 500 comprises an example of data communication system 100, although system 100 may differ. Wireless communication network 500 comprises UE 501, Fifth Generation New Radio Access Node (5GNR AN) 502, and data center 503. Data center 503 comprises Access and Mobility Management Function (AMF) 503, Unified Data Management (UDM) 504, Unified Data Repository (UDR) 505, Policy Control Function 506, Session Management Function (SMF) 507, User Plane Function (UPF) 508, Proxy Call State Control Function (P-CSCF) 509, Interrogating Call State Control Function (I-CSCF) 510, Home Subscriber Server (HSS) 511, Serving Call State Control Function (S-CSCF) 512, and Telephony Application Server (TAS) 513. Data center 503 further comprises wireless network slices 521-529 and IMS slices 531-539. Wireless network slice 521 includes UPF 508. IMS slice 539 includes S-CSCF 512 and TAS 513. IMS slices 531-539 may comprise P-CSCFs, I-CSCFs, S-CSCFs, Emergency-CSCFs (E-CSCFs), TASs, Media Gateway Control Functions (MGCFs), Border Gateway Control Functions (BGCFs), and other IMS elements. IMS slices 531-539 each have a dedicated set of servers for their own components.

P-CSCF 509 comprises a global P-CSCF, and I-CSCF 510 comprises a global I-CSCF. UE 501 is configured with the Fully Qualified Domain Name (FQDN) for global P-CSCF 509. Global P-CSCF 509 always queries global I-CSCF 510. IMS slices 531-539 may have their own P-CSCF and I-CSCF which are used by UE 501 after UE 501 uses global P-CSCF 509 and global I-CSCF 510 and when UE 501 starts using the selected IMS slice. Global P-CSCF 509 and global P-CSCF 510 maintain a data structure that associates IMS slice IDs with their component S-CSCFs, TASs, and other IMS servers by network region. Global P-CSCF 509 and global P-CSCF 510 may then select S-CSCFs, TASs, and other IMS servers that are near UE 501 based on the network region that currently contains UE 501. IMS slice IDs may be transported in SIP slice ID headers. S-CSCF 512 forward slice information like the SIP Slice-ID headers to TAS 513. The other S-CSCFs in IMS slices 531-538 also forward their slice information like their SIP Slice-ID headers to their own TASs. Global P-CSCF 509 forwards slice information including SIP slice ID headers to UE 501. UE 501 stores and uses the slice information including the SIP slice ID headers for SIP registrations, SIP invites, and other SIP messages. Global P-CSCF 509 and global I-CSCF 510 forward SIP messages from UE 501 to the appropriate IMS servers based on IMS slice IDs in the SIP slice ID headers. HSS 511 shares slice information with I-CSCF 510 over interfaces like Diameter Cx and Service-Based Interface (SBI) N70. HSS 511 shares updated slice information with I-CSCF 511 in HSS-initiated notification messages that use interfaces like Cx Push Profile Request (PPR) and N70 Nhss_ImsSubscriber Data Management (ImsSDM).

In a first exemplary operation, UE 501 registers with AMF 503 over 5GNR AN 502 and indicates a Dynamic Network Name (DNN) and an ID/type for wireless network slice 521. AMF 503 retrieves a UE profile for UE 501 over UDM 504. AMF 503 selects SMF 507 based on the DNN. AMF 503 selects wireless network slice 521 based on the slice ID/type and the UE profile. SMF 507 selects UPF 508 based on selected network slice 521. AMF 503, PCF 506, and SMF 507 develop UE context based on network slice 521 and the UE profile. AMF 503 transfers UE context to 5GNR AN 502 and UE 501. SMF 503 transfers UE context to UPF 508. AMF 503 transfers UE context to UDR 505 over UDM 504. The UE context indicates that wireless network slice 521 is currently serving UE 501.

UE 501 transfers an IMS registration to P-CSCF 509 over 5GNR AN 502 and UPF 508. P-CSCF provides front-end security and transfers the IMS registration to I-CSCF 510. In response to the IMS registration, I-CSCF 510 transfers a User Authorization Request (UAR) for UE 501 to HSS 511. In response to the UAR, HSS 511 queries UDR 505 to discover that IMS slice 539 should serve UE 501 because its associated wireless network slice 521 is currently serving UE 501. For example, UDR 505 may host a data structure that correlates individual wireless network slices 521-529 with individual IMS slices 531-539 and that specifically indicates that wireless network slice 521 is correlated with IMS slice 539. UDR 505 may also have additional IMS slice information for IMS slices 531-539 that it provides along with the IMS slice ID. HSS 511 transfers a User Authorization Answer (UAA) to I-CSCF 510 which indicates that IMS slice 539 should serve UE 501. I-CSCF 510 selects IMS slice 539 for UE 501 based on the UAA. I-CSCF 510 transfers the IMS registration to S-CSCF 512. I-CSCF informs P-CSCF 509 that S-CSCF 512 in IMS slice 512 is serving UE 501.

In response to the IMS registration, S-CSCF 512 transfers a Multimedia Authorization Request (MAR) to HSS 511. In response to the MAR, HSS 511 queries UDR 505 to discover authentication data for UE 501. HSS 511 returns a corresponding Multimedia Authorization Answer (MAA) that has the authentication data to S-CSCF 512. S-CSCF 512 authenticates UE 501 based on the MAA over P-CSCF 509 (or the P-CSCF in IMS slice 539), UPF 508, and 5GNR AN 502. After authentication, S-CSCF 512 transfers a Server Assignment Request (SAR) for UE 501 to HSS 511 which returns a corresponding Server Assignment Answer (SAA) to S-CSCF 512. The SAA includes filter criteria and slice information for UE 501. S-CSCF 512 selects TAS 513 for UE 501 based on the SAA and IMS slice 539. S-CSCF 512 instructs TAS 513 to serve UE 501. S-CSCF 512 sends a registration OK message to UE 501 over P-CSCF 509 (or the P-CSCF in IMS slice 539), UPF 508, and 5GNR AN 502. The registration OK message indicates that S-CSCF 512 in IMS slice 539 is currently serving UE 501.

To place a voice call, UE 501 sends a Session Initiation Protocol (SIP) invite message to P-CSCF 509 (or the P-CSCF in IMS slice 539) over 5GNR AN 502 and UPF 508. The SIP invite message indicates S-CSCF 512 and IMS slice 539. P-CSCF 509 (or the P-CSCF in IMS slice 539) sends the SIP invite message to S-CSCF 512 in IMS slice 539. S-CSCF 512 sends the SIP invite message to TAS 513 in IMS slice 539. In response to the SIP invite, TAS 513 transfers a Multimedia Telephony (MM-TEL) Request for UE 501 to HSS 511. HSS 511 obtains MM-TEL data for UE 501 from UDR 505. HSS 511 transfers the MM-TEL data for UE 501 to TAS 513. TAS 513 processes the SIP invite based on the MM-TEL data and directs S-CSCF 512 to forward the SIP invite to the call destination. UE 501 and the call destination exchange call information and network addresses over SIP messaging that traverses 5GNR AN 502, UPF 508, P-CSCF 509 (or the P-CSCF in IMS slice 539), S-CSCF 512, and TAS 513. UE 501 and the call destination exchange packetized voice data over 5GNR AN 502 and UPF 508.

In an alternative second exemplary operation, UE 501 registers with AMF 503 over 5GNR AN 502 and indicates a DNN and an ID/type for wireless network slice 521. AMF 503 retrieves a UE profile for UE 501 over UDM 504. AMF 503 selects SMF 507 based on the DNN. AMF 503 selects wireless network slice 521 based on the slice ID/type and the UE profile. SMF 507 selects UPF 508 based on selected network slice 521. AMF 503, PCF 506, and SMF 507 develop UE context based on network slice 521 and the UE profile. AMF 503 transfers UE context to 5GNR AN 502 and UE 501. SMF 503 transfers UE context to UPF 508. AMF 503 transfers UE context to UDR 505 over UDM 504. The UE context indicates that wireless network slice 521 is currently serving UE 501.

UE 501 transfers an IMS registration to P-CSCF 509 over 5GNR AN 502 and UPF 508. P-CSCF 509 provides front-end security and transfers the IMS registration to I-CSCF 510. In response to the IMS registration, I-CSCF 510 transfers a UAR for UE 501 to HSS 511. In response to the UAR, HSS 511 queries UDR 505 to discover that wireless network slice 521 is currently serving UE 501. HSS 511 transfers a UAA to I-CSCF 510 which indicates that wireless network slice 521 is currently serving UE 501. I-CSCF 510 selects IMS slice 539 for UE 501 based on wireless network slice 521. For example, I-CSCF 510 may host a data structure that correlates individual wireless network slices 521-529 with IMS slices 531-539, and that specifically indicates that network slice 521 is correlated with IMS slice 539. I-CSCF 510 may also have additional IMS slice information for IMS slices 531-539 that it identifies along with the IMS slice ID. I-CSCF 510 transfers the IMS registration to S-CSCF 512. I-CSCF informs P-CSCF 509 that S-CSCF 512 in IMS slice 512 is serving UE 501.

In response to the IMS registration, S-CSCF 512 transfers a MAR to HSS 511. In response to the MAR, HSS 511 queries UDR 505 to discover authentication data for UE 501. HSS 511 returns a corresponding MAA that has the authentication data to S-CSCF 512. S-CSCF 512 authenticates UE 501 based on the MAA over P-CSCF 509 (or the P-CSCF in IMS slice 539), UPF 508, and 5GNR AN 502. After authentication, S-CSCF 512 transfers a SAR for UE 501 to HSS 511 which returns a corresponding SAA to S-CSCF 512. The SAA includes filter criteria and slice information for UE 501. S-CSCF 512 selects TAS 513 for UE 501 based on the SAA and IMS slice 539. S-CSCF instructs TAS 513 to serve UE 501. S-CSCF 512 sends a registration OK message to UE 501 over P-CSCF 509 (or the P-CSCF in IMS slice 539), UPF 508, and 5GNR AN 502. The registration OK message indicates that S-CSCF 512 in IMS slice 539 is currently serving UE 501.

To place a voice call, UE 501 sends a Session Initiation Protocol (SIP) invite message to P-CSCF 509 (or the P-CSCF in IMS slice 539) over 5GNR AN 502 and UPF 508. The SIP invite message indicates S-CSCF 512 and IMS slice 539. P-CSCF 509 (or the P-CSCF in IMS slice 539) sends the SIP invite message to S-CSCF 512 in IMS slice 539. S-CSCF 512 sends the SIP invite message to TAS 513 in IMS slice 539. In response to the SIP invite, TAS 513 transfers an MM-TEL Request for UE 501 to HSS 511. HSS 511 obtains MM-TEL data for UE 501 from UDR 505. HSS 511 transfers the MM-TEL data for UE 501 to TAS 513. TAS 513 processes the SIP invite based on the MM-TEL data and directs S-CSCF 512 to forward the SIP invite to the call destination. UE 501 and the call destination exchange call information and network addresses over SIP messaging that traverses 5GNR AN 502, UPF 508, P-CSCF 509 (or the P-CSCF in IMS slice 539), S-CSCF 512, and TAS 513. UE 501 and the call destination exchange packetized voice data over 5GNR AN 502 and UPF 508.

Figure 6:
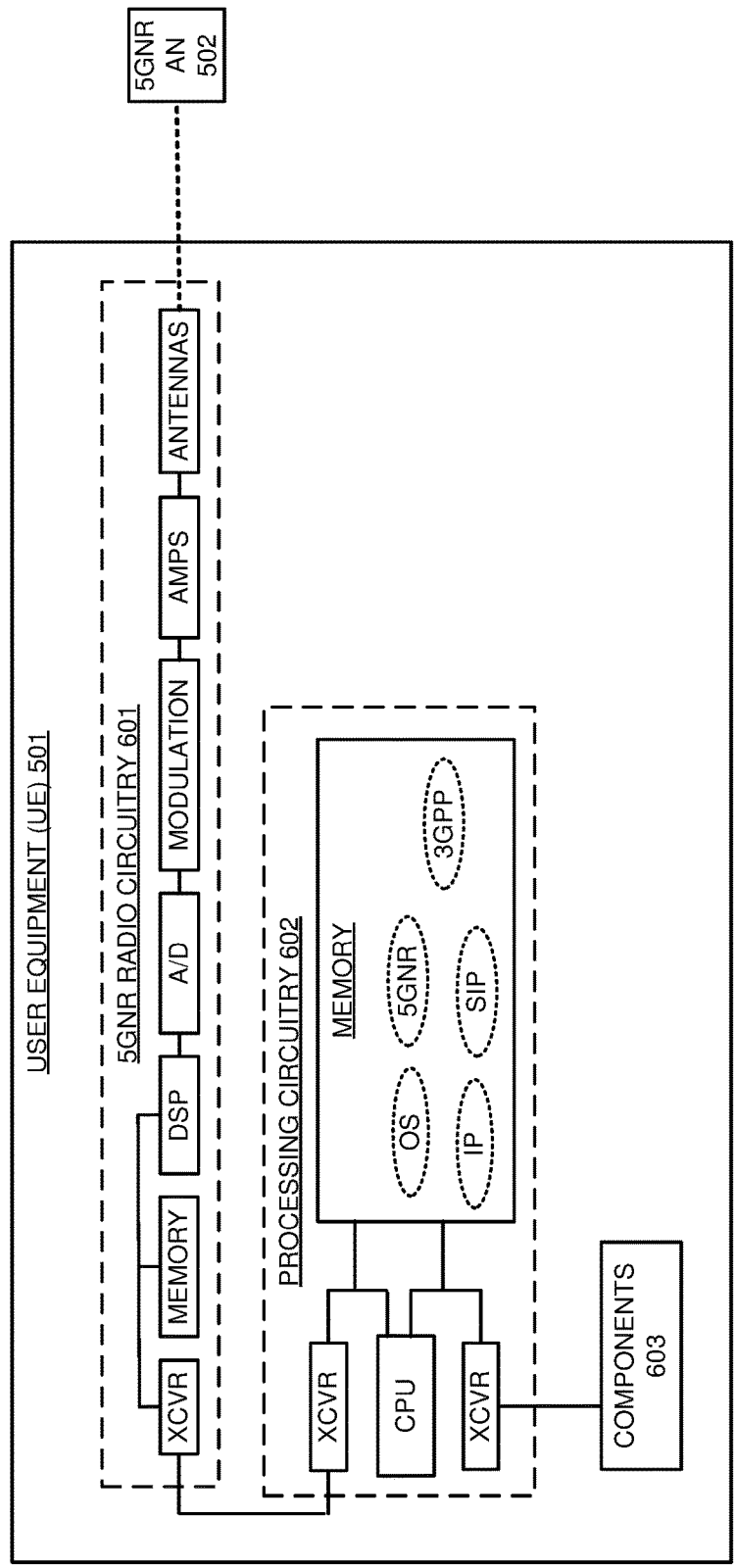
FIG. 6 illustrates an exemplary UE in the wireless communication network that delivers the IMS services to the UE using the IMS slices in association with the wireless network slices.

FIG. 6 illustrates exemplary UE 501 in wireless communication network 500 that delivers the IMS services to UE 501 using IMS slices 531-539 in association with wireless network slices 521-529. UE 501 comprises an example of user communication device 101, although device 101 may differ. UE 501 comprises 5GNR radio circuitry 601, processing circuitry 602, and components 603. Components 603 comprise sensors, cameras, medical devices, and/or some other user apparatus. 5GNR radio 601 comprises antennas, amplifiers, filters, modulation, analog-to-digital interfaces, DSPs, memories, and transceivers (XCVRs) that are coupled over bus circuitry. Processing circuitry 602 comprises one or more CPUs, one or more memories, and one or more transceivers that are coupled over bus circuitry. The one or more memories in processing circuitry 603 store software like an Operating System (OS), 5GNR application (5GNR), Third Generation Partnership Project application (3GPP), Internet Protocol application (IP), and Session Initiation Protocol application (SIP). The antennas in 5GNR radio circuitry 601 exchange 5GNR signals with 5GNR AN 502. A transceiver in radio 601 is coupled to a transceiver in processing circuitry 602. In processing circuitry 602, the one or more CPUs retrieve the software from the one or more memories and execute the software to direct the operation of UE 501 as described herein. In particular, UE 501 receives IMS services from IMS slices 531-539 over associated wireless network slices 521-529.

Figure 7:
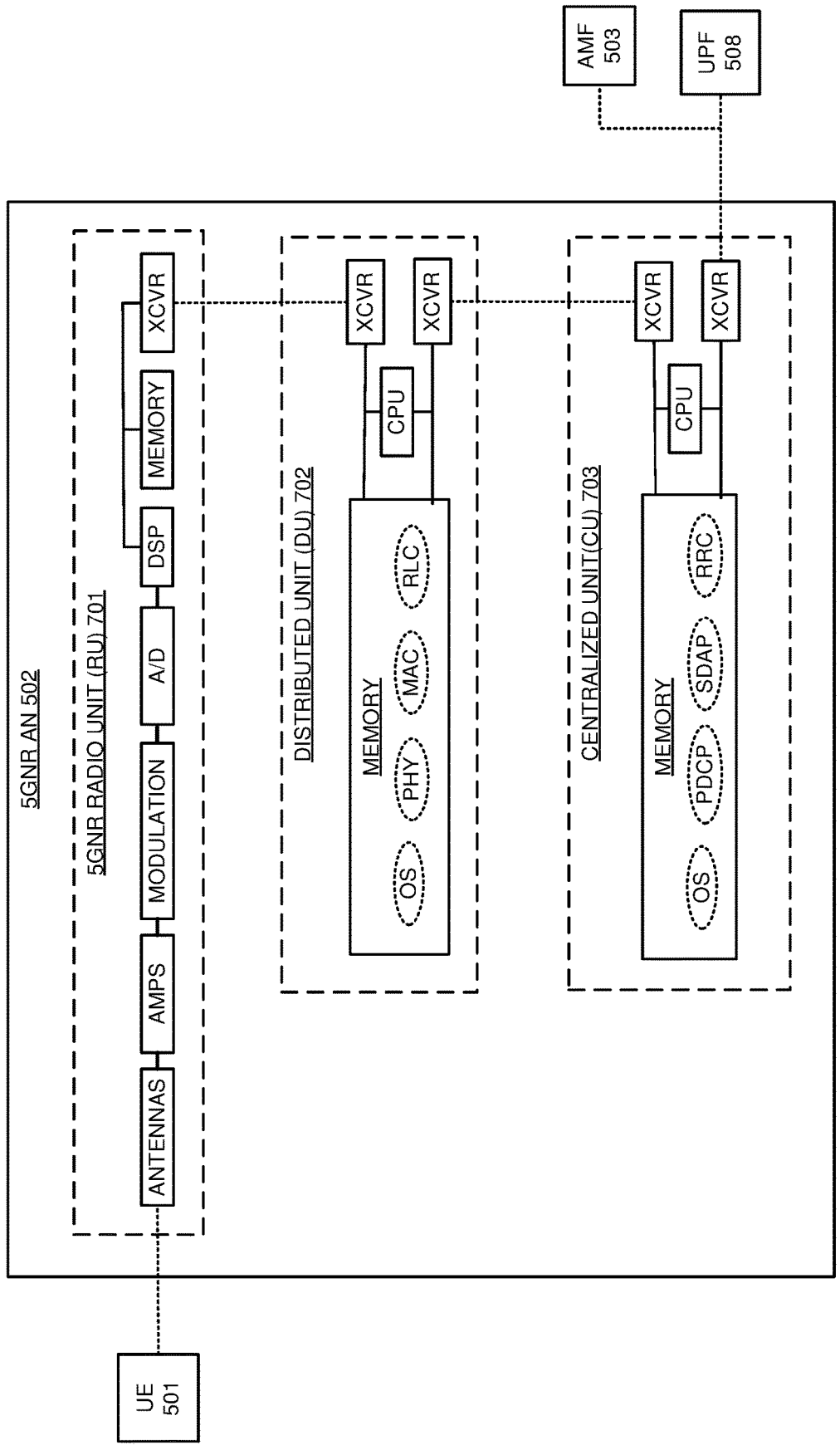
FIG. 7 illustrates exemplary Fifth Generation New Radio Access Node (5GNR AN) in the wireless communication network that delivers the IMS services to the UE using the IMS slices in association with the wireless network slices.

FIG. 7 illustrates exemplary Fifth Generation New Radio Access Node (5GNR AN) 502 in wireless communication network 500 that delivers the IMS services to UE 501 using IMS slices 531-539 in association with wireless network slices 521-529. 5GNR AN 502 comprises an example of wireless communication network 110, although network 110 may differ. 5GNR AN 502 comprises 5GNR Radio Unit (RU) 701, Distributed Unit (DU) 702, and Centralized Unit (CU) 703. 5GNR RU 701 comprises antennas, amplifiers, filters, modulation, analog-to-digital interfaces, DSP, memory, radio applications, and transceivers that are coupled over bus circuitry. DU 702 comprises memory, CPU, user interfaces and components, and transceivers that are coupled over bus circuitry. The memory in DU 702 stores operating system and 5GNR network applications for Physical Layer (PHY), Media Access Control (MAC), and Radio Link Control (RLC). CU 803 comprises memory, CPU, and transceivers that are coupled over bus circuitry. The memory in CU 703 stores an operating system and 5GNR network applications for Packet Data Convergence Protocol (PDCP), Service Data Adaption Protocol (SDAP), and Radio Resource Control (RRC). The antennas in 5GNR RU 701 are wirelessly coupled to UE 501 over 5GNR links. Transceivers in 5GNR RU 701 are coupled to transceivers in DU 702. Transceivers in DU 702 are coupled to transceivers in CU 703. Transceivers in CU 703 are coupled to AMF 503 and UPF 508. The DSP and CPU in RU 701, DU 702, and CU 703 execute the radio applications, operating systems, and network applications to exchange data and signaling with UE 501, AMF 503, and UPF 508 as described herein. In particular, 5GNR AN 502 delivers IMS services to UE 501 from IMS slices 531-539 over associated wireless network slices 521-529.

Figure 8:
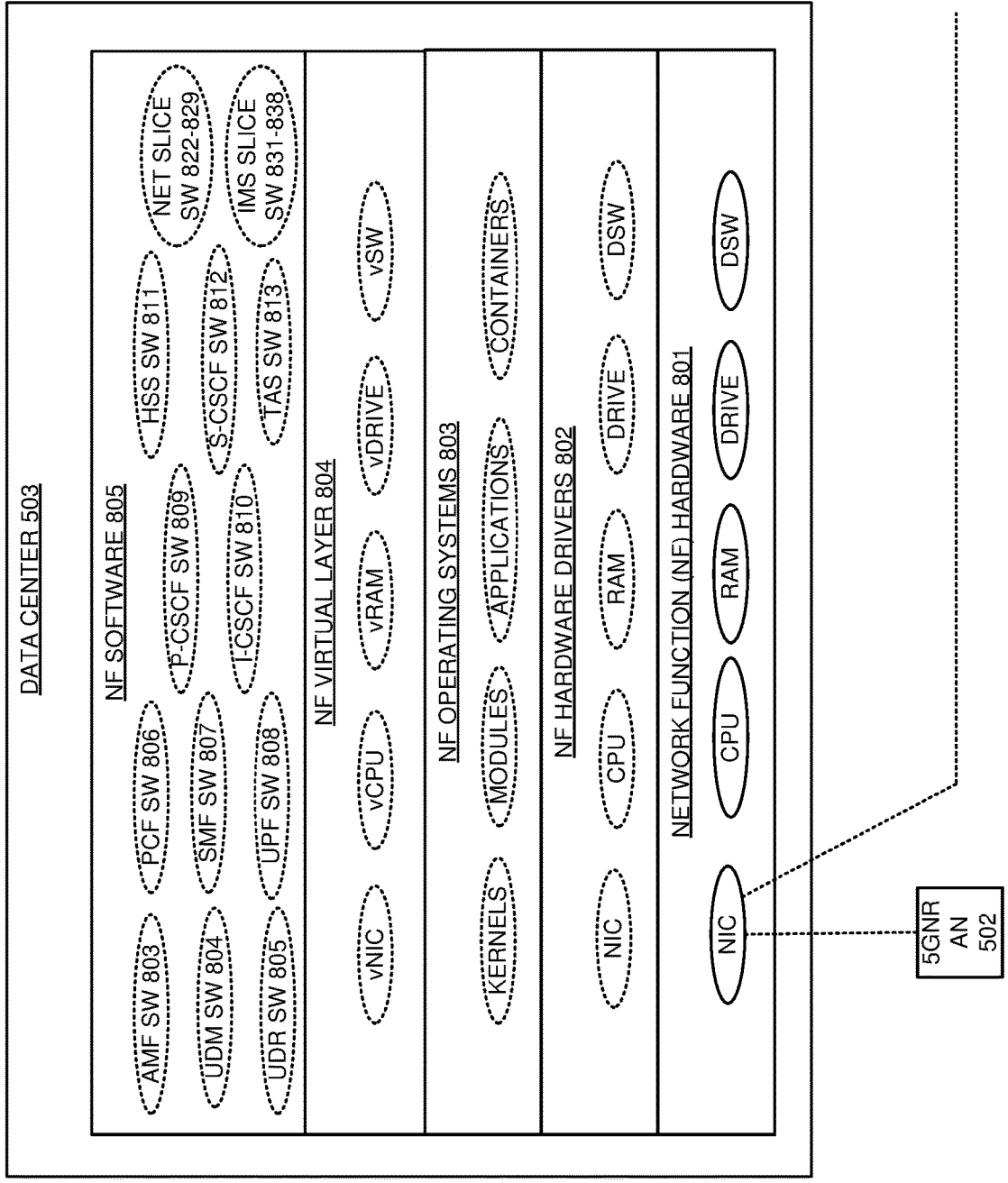
FIG. 8 illustrates an exemplary data center in the wireless communication network that delivers the IMS services to the UE using the IMS slices in association with the wireless network slices.

FIG. 8 illustrates exemplary data center 503 in wireless communication network 500 that delivers the IMS services to UE 501 using IMS slices 531-539 in association with wireless network slices 521-529. Data center 503 comprises an example of wireless communication network 110 and IMS 120, although network 110 and IMS 120 may differ. Data center 503 comprises NF hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, applications, and containers. NF virtual layer 804 comprises vNIC, vCPU, vRAM, vDRIVE, and vSW. NF SW 805 comprises AMF SW 803, UDM SW 804, UDR SW 805, PCF SW 806, SMF SW 807, UPF SW 808, P-CSCF SW 809, I-CSCF SW 810, HSS SW 811, S-CSCF SW 812, TAS SW 813, network slice SW 822-829, and IMS slice SW 831-838. UPF SW 808 represents network slice SW 821. S-CSCF SW 812 and TAS SW 813 represents IMS slice SW 839. The NIC in NF hardware 801 are coupled to 5GNR AN 502 and external systems like call destinations. NF hardware 801 executes NF hardware drivers 802, NF operating systems 803, NF virtual layer 804, and NF SW 805 to form and operate AMF 503, UDM 504, UDR 505, PCF 506, SMF 507, UPF 508, P-CSCF 509, I-CSCF 510, HSS 511, S-CSCF 512, TAS 513, and slices 521-529 and 531-539 as described herein. Thus, data center 503 comprises one or more microprocessors and one or more non-transitory computer readable storage media that store processing instructions that direct data center 530 to perform the methods described herein. Network data center 503 may be located at a single site or be distributed across multiple geographic locations.

Figure 9:
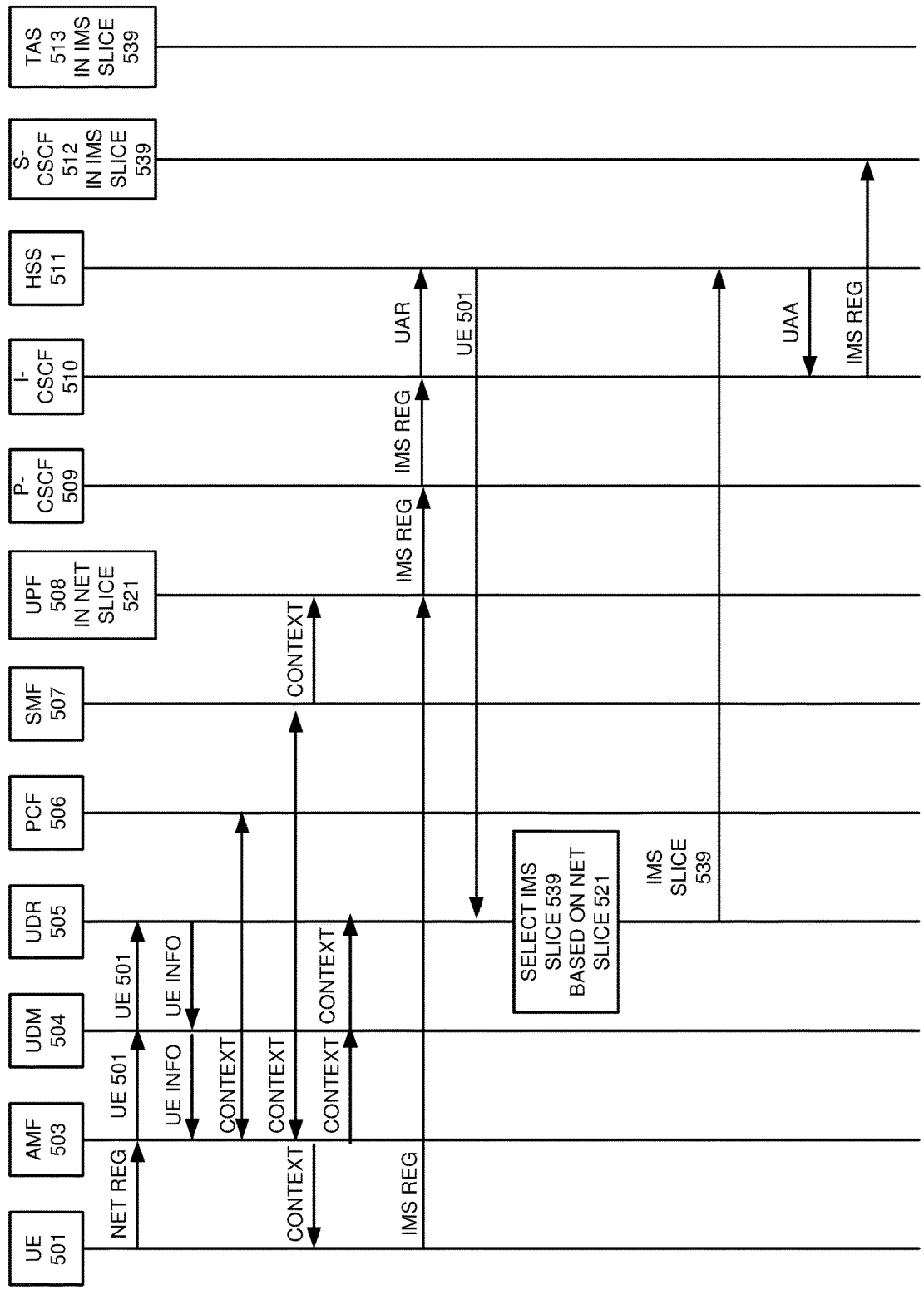
FIG. 9 illustrates an exemplary operation of the wireless communication network to deliver the IMS services to the UE using the IMS slices in association with the wireless network slices.

FIG. 9 illustrates an exemplary operation of wireless communication network 500 to deliver the IMS services to UE 501 using IMS slices 531-539 in association with wireless network slices 521-529. The operation may vary in other examples. UE 501 registers with AMF 503. AMF 503 requests UE information for UE 501 from UDM 504. UDM 504 retrieves the UE information from UE 501 from UDR 505 and transfers the UE information to AMF 503. AMF 503 and PCF 506 develop UE context for UE 501. AMF 503 and SMF 507 develop additional UE context for UE 501 that includes the selection of wireless network slice 521. SMF 507 selects UPF 508 based on the UE context and the selection of wireless network slice 521. AMF 503 transfers UE context to 5GNR AN 502 and UE 501. SMF 503 transfers UE context to UPF 508. AMF 503 transfers UE context to UDR 505 over UDM 504. The UE context in UDR 505 indicates that wireless network slice 521 is now serving UE 501.

UE 501 transfers an IMS registration to P-CSCF 509 over UPF 508. PCSCF 509 is a global P-CSCF with a FQDN that is used by UE 501. P-CSCF 509 transfers the IMS registration to I-CSCF 510 which is also a global I-CSCF. In response to the IMS registration, I-CSCF 510 transfers a User Authorization Request (UAR) indicating UE 501 to HSS 511. HSS 511 queries UDR 505 to discover that IMS slice 539 should serve UE 501 since associated wireless network slice 521 is currently serving UE 501. For example, UDR 505 may host a data structure that correlates individual wireless network slices 521-529 with IMS slices 531-539 and that specifically correlates wireless network slice 521 with IMS slice 539. HSS 511 transfers a User Authorization Answer (UAA) to I-CSCF 510 and indicates that IMS slice 539 should serve UE 501. I-CSCF 510 selects IMS slice 539 for UE 501 based on the UAA. The operation continues in FIG. 10.

Figure 10:
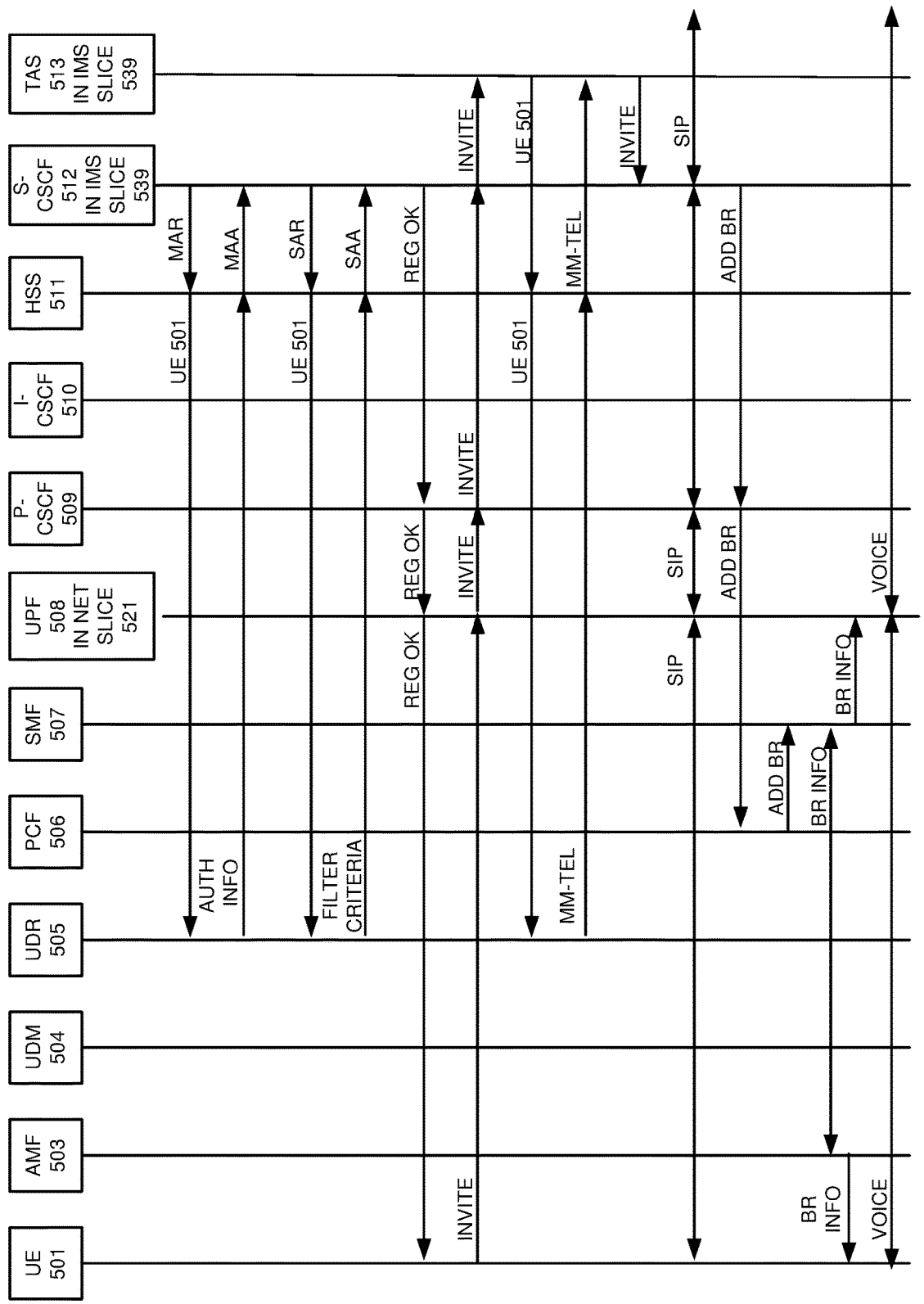
FIG. 10 illustrates an exemplary operation of the wireless communication network to deliver the IMS services to the UE using the IMS slices in association with the wireless network slices.

FIG. 10 illustrates an exemplary operation of wireless communication network 500 to deliver the IMS services to UE 501 using IMS slices 531-539 in association with wireless network slices 521-529. The operation may vary in other examples. The operation continues from FIG. 9. In response to the IMS registration, S-CSCF 512 transfers a Multimedia Authorization Request (MAR) to HSS 511. In response to the MAR, HSS 511 queries UDR 505 to discover authentication data for UE 501. HSS 511 returns a corresponding Multimedia Authorization Answer (MAA) that has the authentication data to S-CSCF 512. S-CSCF 512 authenticates UE 501 based on the MAA. After authentication, S-CSCF 512 transfers a Server Assignment Request (SAR) for UE 501 to HSS 511. HSS 511 queries UDR 505 to discover filter criteria for UE 502. HSS transfers a Server Assignment Answer (SAA) having the filter criteria to S-CSCF 512. S-CSCF 512 selects TAS 513 for UE 501 based on the SAA and selected IMS slice 539. S-CSCF 512 sends a registration OK message to UE 501 over P-CSCF 509 and UPF 508. The registration OK message indicates that S-CSCF 512 in IMS slice 539 is currently serving UE 501.

To place a voice call, UE 501 sends a Session Initiation Protocol (SIP) invite message to P-CSCF 509 over 5GNR AN 502 and UPF 508. The SIP invite message indicates S-CSCF 512 and IMS slice 539—perhaps in a SIP slice ID header. P-CSCF 509 sends the SIP invite message to S-CSCF 512 in IMS slice 539 based on the IMS slice ID. S-CSCF 512 sends the SIP invite message to TAS 513 in IMS slice 539 based on the IMS slice ID. In response to the SIP invite, TAS 513 transfers a Multimedia Telephony (MM-TEL) Request for UE 501 to HSS 511. HSS 511 obtains MM-TEL data for UE 501 from UDR 505. HSS 511 transfers the MM-TEL data for UE 501 to TAS 513. TAS 513 processes the SIP invite based on the MM-TEL data and directs S-CSCF 512 to exchange SIP signaling with UE 501 and the call destination. In response to the SIP exchange, S-CSCF 512 directs PCF 506 over P-CSCF 509 to add a voice bearer (ADD BR) for UE 501. PCF 506 directs SMF 507 to add the voice bearer for UE 501. SMF 507 and AMF 503 develop voice bearer information for UE 501. SMF 507 transfers the voice bearer information to UPF 508 in network slice 521. AMF 503 transfers the voice bearer information to UE 501. UE 501 and the call destination exchange voice data over UPF 508 in network slice 521.

Figure 11:
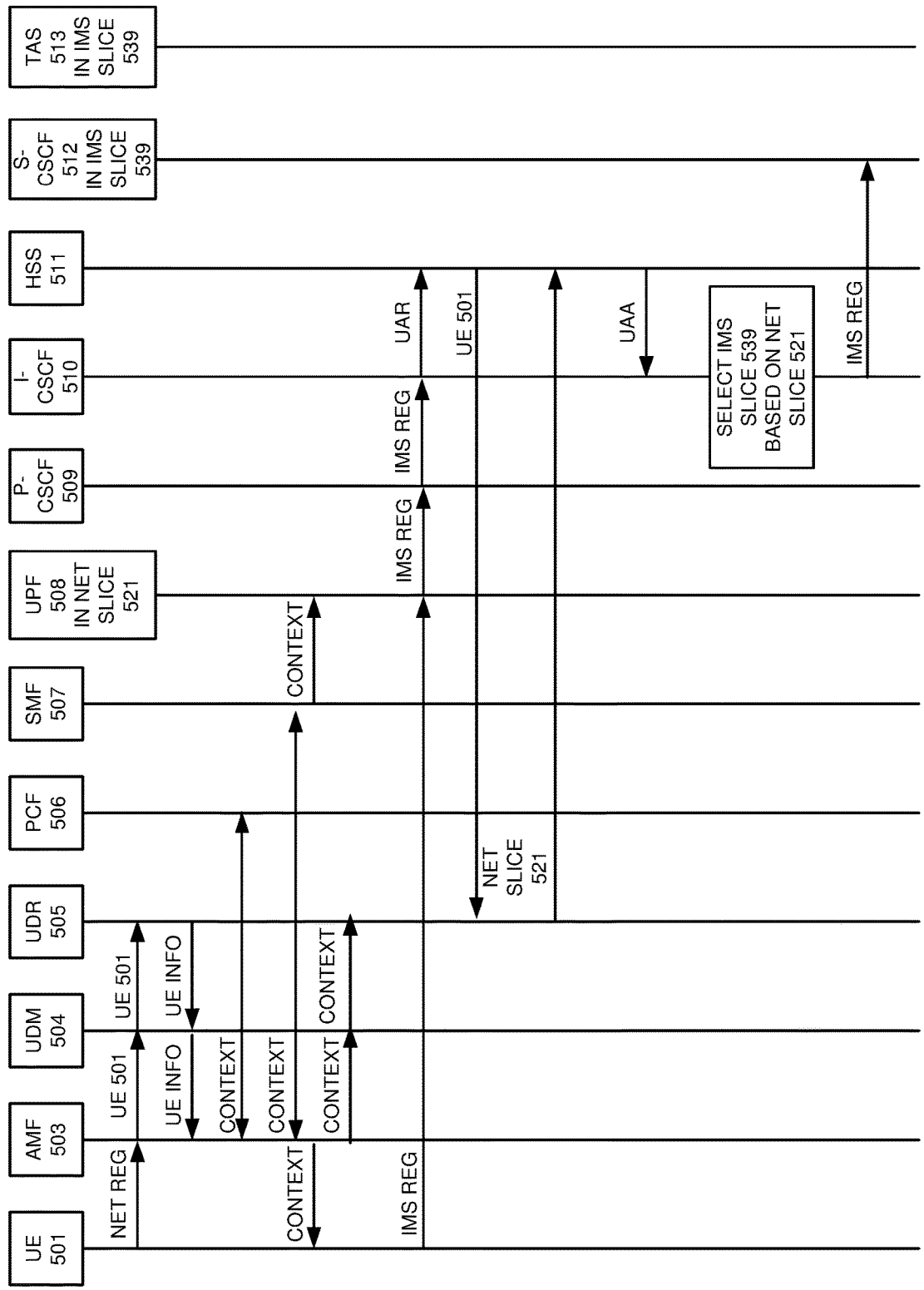
FIG. 11 illustrates an exemplary operation of the wireless communication network to deliver the IMS services to the UE using the IMS slices in association with the wireless network slices.

FIG. 11 illustrates an exemplary operation of wireless communication network 500 to deliver the IMS services to UE 501 using IMS slices 531-539 in association with wireless network slices 521-529. The operation may vary in other examples. UE 501 registers with AMF 503. AMF 503 requests UE information for UE 501 from UDM 504. UDM 504 retrieves the UE information from UE 501 from UDR 505 and transfers the UE information to AMF 503. AMF 503 and PCF 506 develop UE context for UE 501. AMF 503 and SMF 507 develop additional UE context for UE 501 that includes the selection of wireless network slice 521. SMF 507 selects UPF 508 based on the UE context and the selection of wireless network slice 521. AMF 503 transfers UE context to 5GNR AN 502 and UE 501. SMF 503 transfers UE context to UPF 508. AMF 503 transfers UE context to UDR 505 over UDM 504. The UE context in UDR 505 indicates that wireless network slice 521 is now serving UE 501.

UE 501 transfers an IMS registration to P-CSCF 509 over UPF 508. PCSCF is a global P-CSCF with a FQDN that is used by UE 501. P-CSCF 509 transfers the IMS registration to I-CSCF 510 which is a global I-CSCF. In response to the IMS registration, I-CSCF 510 transfers a User Authorization Request (UAR) indicating UE 501 to HSS 511. HSS 511 queries UDR 505 to discover that wireless network slice 521 is currently serving UE 501. HSS 511 transfers a User Authorization Answer (UAA) to I-CSCF 510 and indicates that wireless network slice 521 is currently serving UE 501. I-CSCF 510 selects IMS slice 539 for UE 501 since associated wireless network slice 521 is currently serving UE 501. For example, I-CSCF 510 may host a data structure that correlates individual wireless network slices 521-529 with IMS slices 531-539 and that specifically correlates wireless network slice 521 with IMS slice 539. The operation continues in FIG. 12.

Figure 12:
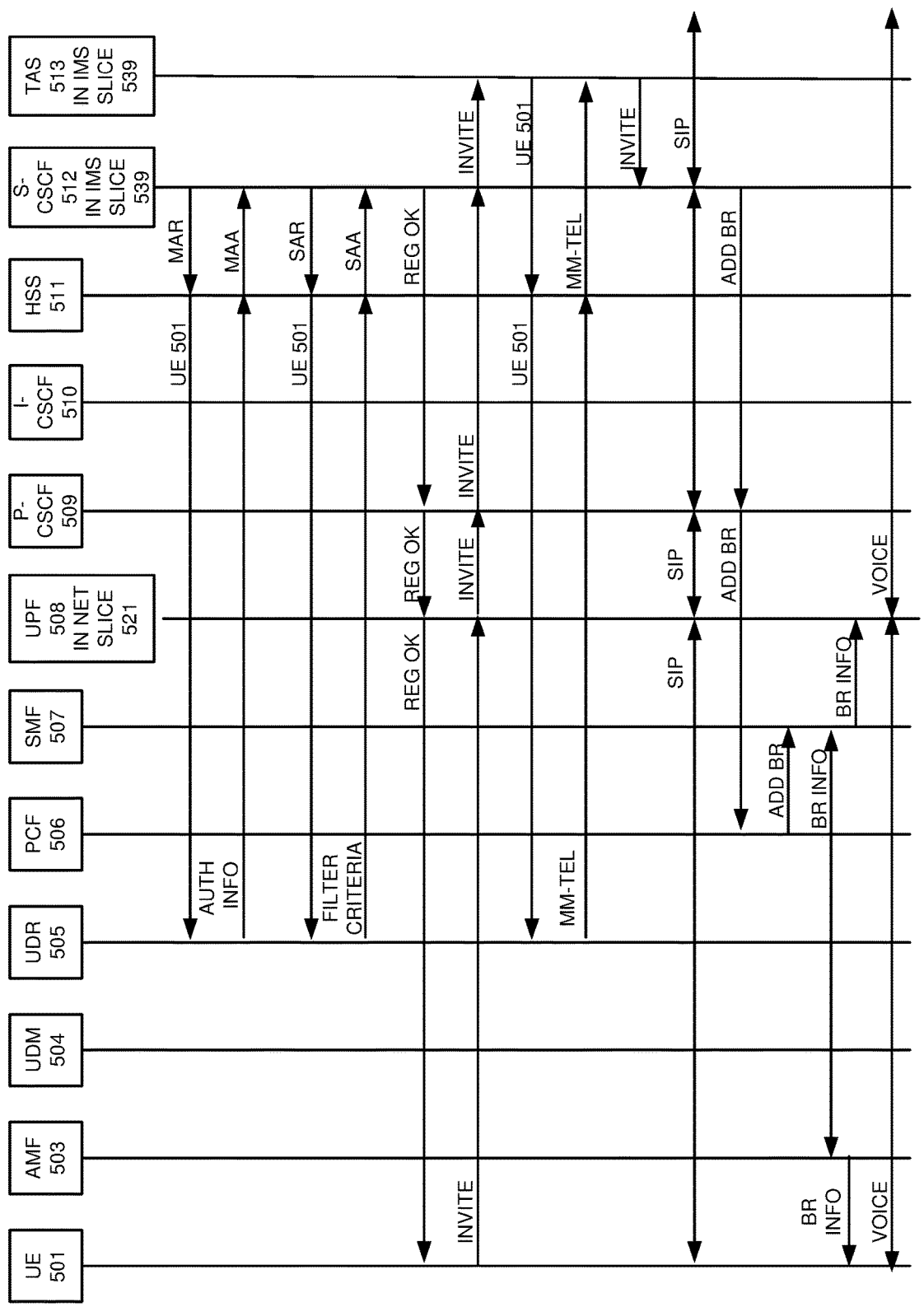
FIG. 12 illustrates an exemplary operation of the wireless communication network to deliver the IMS services to the UE using the IMS slices in association with the wireless network slices.

FIG. 12 illustrates an exemplary operation of wireless communication network 500 to deliver the IMS services to UE 501 using IMS slices 531-539 in association with wireless network slices 521-529. The operation may vary in other examples. The operation continues from FIG. 11. In response to the IMS registration, S-CSCF 512 transfers a Multimedia Authorization Request (MAR) to HSS 511. In response to the MAR, HSS 511 queries UDR 505 to discover authentication data for UE 501. HSS 511 returns a corresponding Multimedia Authorization Answer (MAA) that has the authentication data to S-CSCF 512. S-CSCF 512 authenticates UE 501 based on the MAA. After authentication, S-CSCF 512 transfers a Server Assignment Request (SAR) for UE 501 to HSS 511. HSS 511 queries UDR 505 to discover filter criteria for UE 502. HSS transfers a Server Assignment Answer (SAA) having the filter criteria to S-CSCF 512. S-CSCF 512 selects TAS 513 for UE 501 based on the SAA and selected IMS slice 539. S-CSCF 512 sends a registration OK message to UE 501 over P-CSCF 509 and UPF 508. The registration OK message indicates that S-CSCF 512 in IMS slice 539 is currently serving UE 501.

To place a voice call, UE 501 sends a Session Initiation Protocol (SIP) invite message to P-CSCF 509 over 5GNR AN 502 and UPF 508. The SIP invite message indicates S-CSCF 512 and IMS slice 539—perhaps in a SIP slice ID header. P-CSCF 509 sends the SIP invite message to S-CSCF 512 in IMS slice 539 based on the IMS slice ID. S-CSCF 512 sends the SIP invite message to TAS 513 in IMS slice 539 based on the IMS slice ID. In response to the SIP invite, TAS 513 transfers a Multimedia Telephony (MM-TEL) Request for UE 501 to HSS 511. HSS 511 obtains MM-TEL data for UE 501 from UDR 505. HSS 511 transfers the MM-TEL data for UE 501 to TAS 513. TAS 513 processes the SIP invite based on the MM-TEL data and directs S-CSCF 512 to exchange SIP signaling with UE 501 and the call destination. In response to the SIP exchange, S-CSCF 512 directs PCF 506 over P-CSCF 509 to add a voice bearer (ADD BR) for UE 501. PCF 506 directs SMF 507 to add the voice bearer for UE 501. SMF 507 and AMF 503 develop voice bearer information for UE 501. SMF 507 transfers the voice bearer information to UPF 508 in network slice 521. AMF 503 transfers the voice bearer information to UE 501. UE 501 and the call destination exchange voice data over UPF 508 in network slice 521.

Figure 13:
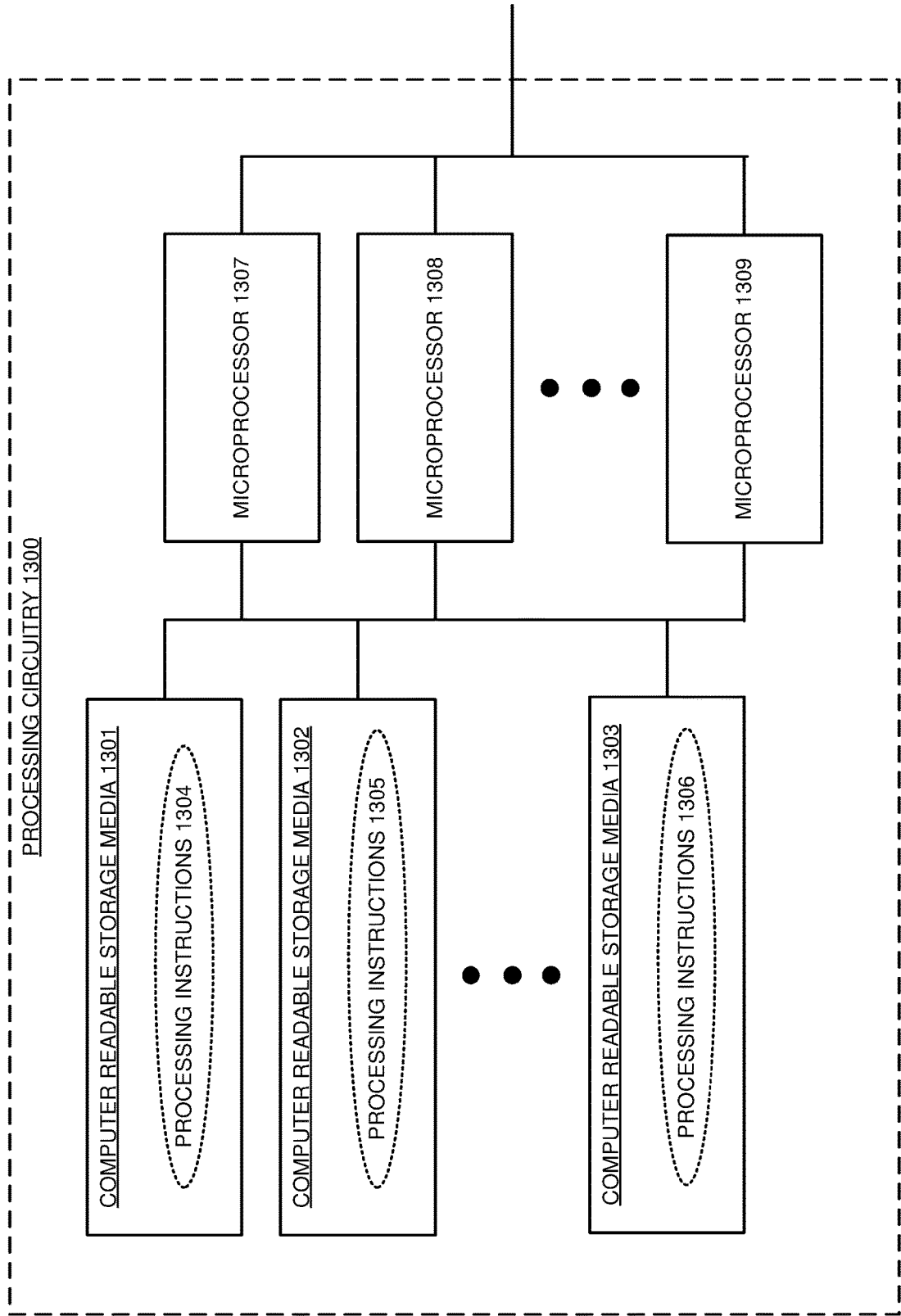
FIG. 13 illustrates exemplary processing circuitry to deliver IMS services to user communication devices using IMS slices in association with wireless network slices.

FIG. 13 illustrates exemplary processing circuitry 1300 to deliver IMS services to user communication devices using IMS slices in association with wireless network slices. Processing circuitry 1300 comprises an example of wireless communication network 110 and IMS 120, although network 110 and IMS 120 may differ. Processing circuitry 1300 comprises computer readable storage media 1301-1303 and microprocessors 1307-1309 that are communicatively coupled. Computer readable storage media 1301-1303 store processing instructions 1304-1306 in a non-transitory manner. Microprocessors 1307-1309 comprise DSPs, CPUs, GPUs, ASICs, and/or some other data processing hardware. Computer readable storage media 1301-1303 comprises RAM, flash circuitry, disk drives, and/or some other type of data storage apparatus. Microprocessors 1307-1309 retrieve processing instructions 1304-1306 from non-transitory computer readable storage media 1301-1303. Microprocessors 1307-1309 execute processing instructions 1304-1306 to deliver IMS services to IMS user communication devices using IMS slices in association with wireless network slices as described above for data communication system 100 and wireless communication network 500. The amount of storage media, microprocessors, processing instructions that are shown in FIG. 13 is exemplary and may vary in other examples.

The wireless communication system circuitry described above comprises computer hardware and software that form special-purpose data communication circuitry to deliver IMS services to user communication devices using IMS slices in association with wireless network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to deliver IMS services to user communication devices using IMS slices in association with wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to use Internet Protocol Multimedia Subsystem (IMS) slices in association with wireless network slices, the method comprising:

receiving an IMS registration from a user device that includes a user Identifier (ID) for the user device;

in response, identifying one of the wireless network slices that currently serves the user device based on the user ID;

hosting a data structure that correlates individual ones of the wireless network slices with individual ones of the IMS slices;

selecting one of the IMS slices that is associated with the one of the wireless network slices that currently serves the user device based on the data structure; and serving an IMS service to the user device from the one of the IMS slices over the one of the wireless network slices.

2. The method of claim 1 wherein:

the data structure correlates a network slice ID for the one of the wireless network slices with an IMS slice ID for the one of the IMS slices; and further comprising:

storing User Equipment (UE) context for the user device that indicates the user ID and the network slice ID; and wherein:

selecting the one of the IMS slices for the user device comprises selecting the one of the IMS slices based on an association of the user ID with the network slice ID by the UE context and the correlation of the network slice ID with the IMS slice ID by the data structure.

3. The method of claim 1, wherein selecting the one of the IMS slices for the user device comprises selecting a Serving Call State Control Function (S-CSCF) based on the one of the wireless network slices.

4. The method of claim 1, wherein selecting the one of the IMS slices for the user device comprises selecting a Serving Call State Control Function (S-CSCF) based on the one of the wireless network slices and a location of the user device.

5. The method of claim 1, wherein selecting the one of the IMS slices for the user device comprises selecting an Application Server (AS) based on the one of the wireless network slices.

6. The method of claim 1, wherein selecting the one of the IMS slices for the user device comprises selecting an Application Server (AS) based on the one of the wireless network slices and a location of the user device.

7. The method of claim 1 further comprising:
transferring a user message to the user device that indicates the one of the IMS slices;
receiving an IMS message from the user device that indicates the one of the IMS slices; and
transferring the IMS message to the one of the IMS slices based on the indication of the one of the IMS slices in the IMS message.

8. The method of claim 1 further comprising:
identifying a different one of the IMS slices for the one wireless of the network slices, and in response, transferring an IMS message to the user device that causes the user device to transfer another IMS registration;
receiving the other IMS registration from the user device, and in response, identifying the one of the wireless network slices;
selecting the different one of the IMS slices for the user device based on the one of the wireless network slices and the data structure; and
serving the IMS service to the user device from the different one of the IMS slices over the one of the wireless network slices.

9. A method to use Internet Protocol Multimedia Subsystem (IMS) slices in association with wireless network slices, the method comprising:
an Interrogating Call State Control Function (I-CSCF) receiving an IMS registration having a user Identifier (ID) for a user communication device, and in response, transferring the user ID to a Home Subscriber Server (HSS);
the HSS transferring the user ID to a Uniform Data Repository (UDR);
the UDR identifying one of the wireless network slices that currently serves the user communication device;
the UDR hosting a data structure that correlates individual ones of the wireless network slices with individual ones of the IMS slices;
the UDR selecting one of the IMS slices that is associated with the one of the wireless network slices that currently serves the user communication device based on the data structure;
the UDR indicating the user ID and an IMS slice ID for the one of the IMS slices to the HSS;
the HSS indicating the user ID and the IMS slice ID to the I-CSCF;
the I-CSCF selecting the one of the IMS slices for the user communication device based on the IMS slice ID; and
the one of the IMS slices serving an IMS service to the user communication device over the one of the wireless network slices that currently serves the user communication device.

10. The method of claim 9 further comprising:
the UDR storing User Equipment (UE) context for the user communication device that includes the user ID and the network slice ID for the one of the wireless network slices serves the user communication device; and wherein:
the data structure correlates the network slice ID with an IMS slice ID for the one of the IMS slices; and
the UDR selecting the one of the IMS slices comprises the UDR identifying the one of the IMS slices based on an association of the user ID with the network slice ID by the UE context and the correlation of the network slice ID with the IMS slice ID by the data structure.

11. The method of claim 9, wherein the I-CSCF selecting the one of the IMS slices for the user communication device comprises selecting a Serving Call State Control Function (S-CSCF) based on the IMS slice ID.

12. The method of claim 9, wherein the I-CSCF selecting the one of the IMS slices for the user communication device comprises selecting a Serving Call State Control Function (S-CSCF) based on the IMS slice ID and a location of the user communication device.

13. The method of claim 9, wherein the I-CSCF selecting the one of the IMS slices for the user communication device comprises selecting an Application Server (AS) based on the IMS slice ID.

14. The method of claim 9, wherein the I-CSCF selecting the one of the IMS slices for the user communication device comprises selecting an Application Server (AS) based on the IMS slice ID and a location of the user communication device.

15. The method of claim 9 further comprising:
the I-CSCF indicating an IMS slice ID for the one of the IMS slices to a Proxy Call State Control Function (P-CSCF);
the P-CSCF transferring the IMS slice ID to the user communication device;
the P-CSCF receiving an IMS message from the user communication device that indicates the IMS slice ID; and
the P-CSCF transferring the IMS message to the one of the IMS slices based on the IMS slice ID.

16. The method of claim 9 further comprising:
the UDR identifying a different one of the IMS slices for the one wireless of the network slices, and in response, indicating the different one of the IMS slices for the one wireless of the network slices to the HSS;
the HSS indicating the different one of the IMS slices for the one wireless of the network slices to the I-CSCF;
the I-CSCF indicating the different one of the IMS slices to a Serving Call State Control Function (S-CSCF) in the one of the IMS slices;
the S-CSCF transferring an IMS message to the user communication device that causes the user communication device to transfer another IMS registration;
the I-CSCF receiving the other IMS registration having the user ID for the user communication device, and in response, transferring the user ID to the HSS;
the HSS transferring the user ID to the UDR;

the UDR identifying the one of the wireless network slices that currently serves the user communication device;

the UDR selecting the different one of the IMS slices that is associated with the one of the wireless network slices that currently serves the user communication device based on the data structure;

the UDR indicating the user ID and a different IMS slice ID for the different one of the IMS slices to the HSS;

the HSS indicating the user ID and the different IMS slice ID to the I-CSCF;

the I-CSCF selecting the different one of the IMS slices for the user communication device based on the different IMS slice ID; and the different one of the IMS slices serving the IMS service to the user communication device over the one of the wireless network slices that currently serves the user communication device.

17. A data communication system to use Internet Protocol Multimedia Subsystem (IMS) slices in association with wireless network slices, the data communication system comprising:

an Interrogating Call State Control Function (I-CSCF) to receive an IMS registration having a user Identifier (ID) for a user communication device, and in response, transfer the user ID to a Home Subscriber Server (HSS);

the HSS to transfer the user ID to a Uniform Data Repository (UDR);

the UDR to identify a network slice ID for one of the wireless network slices that currently serves the user communication device and indicate the user ID and the network slice ID to the HSS;

the HSS to indicate the user ID and the network slice ID to the I-CSCF;

the I-CSCF hosting a data structure that correlates individual ones of the wireless network slices with individual ones of the IMS slices;

the I-CSCF to select one of the IMS slices for the user communication device based on the data structure and the network slice ID; and the one of the IMS slices to serve an IMS service to the user communication device over the one of the wireless network slices that currently serves the user communication device.

18. The data communication system of claim 17, wherein the I-CSCF is to select a Serving Call State Control Function (S-CSCF) based on the network slice ID to select the one of the IMS slices for the user communication device.

19. The data communication system of claim 17, wherein the I-CSCF is to select an Application Server (AS) based on the network slice ID to select the one of the IMS slices for the user communication device.

20. The data communication system of claim 17 further comprising:

the I-CSCF to indicate an IMS slice ID for the one of the IMS slices to a Proxy Call State Control Function (P-CSCF);

the P-CSCF to transfer the IMS slice ID to the user communication device;

the P-CSCF to receive an IMS message from the user communication device that indicates the IMS slice ID; and the P-CSCF to transfer the IMS message to the one of the IMS slices based on the IMS slice ID.

* * * * *